United States Patent
Peng et al.

(10) Patent No.: US 8,717,953 B2
(45) Date of Patent: May 6, 2014

(54) METHOD AND APPARATUS FOR SENDING AND RESPONDING TO NON-3GPP2 SYSTEM INFORMATION IN AN HRPD SYSTEM

(75) Inventors: Zhiwei Peng, Shenzhen (CN); Yonggang Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 166 days.

(21) Appl. No.: 13/258,303

(22) PCT Filed: Dec. 21, 2009

(86) PCT No.: PCT/CN2009/075790
§ 371 (c)(1),
(2), (4) Date: Sep. 23, 2011

(87) PCT Pub. No.: WO2010/111871
PCT Pub. Date: Oct. 7, 2010

(65) Prior Publication Data
US 2012/0020262 A1 Jan. 26, 2012

(30) Foreign Application Priority Data
Apr. 1, 2009 (CN) .......................... 2009 1 0081059

(51) Int. Cl.
*H04W 4/00* (2009.01)
*H04W 36/14* (2009.01)
*H04W 88/06* (2009.01)

(52) U.S. Cl.
CPC .............. *H04W 36/14* (2013.01); *H04W 88/06* (2013.01)
USPC ...................................................... 370/310

(58) Field of Classification Search
USPC ...................................................... 370/310
See application file for complete search history.

(56) References Cited

U.S. PATENT DOCUMENTS

| 5,555,244 | A  | * | 9/1996 | Gupta et al. | ................... | 370/397 |
| 7,209,741 | B2 | * | 4/2007 | Julka et al. | ................. | 455/435.1 |

(Continued)

FOREIGN PATENT DOCUMENTS

| CN | 1681332 A | 10/2005 |
| CN | 101171850 A | 4/2008 |

(Continued)

OTHER PUBLICATIONS

International Search Report in international application No. PCT/CN2009/075790, mailed on Apr. 1, 2011.

(Continued)

*Primary Examiner* — Melvin Marcelo
*Assistant Examiner* — Kenneth P Hunt
(74) *Attorney, Agent, or Firm* — Oppedahl Patent Law Firm LLC (57) ABSTRACT

The present invention discloses a method for sending non-3GPP2 system information in a high rate packet data system, which comprises: setting a non-3GPP2 SystemInfo Transfer message in an HRPD system; generating the non-3GPP2 SystemInfo Transfer message and sending it to a multimode mobile terminal supporting both the HRPD system and the non-3GPP2 system when a network side of the HRPD system determines that the multimode mobile terminal is located in an area covered by the HRPD system together with the non-3GPP2 system. The present invention also discloses a method for responding to the non-3GPP2 system information. The present invention further discloses apparatuses for realizing the above-mentioned methods. The present invention is simple and practical.

12 Claims, 4 Drawing Sheets

(56) References Cited

U.S. PATENT DOCUMENTS

| | | | |
|---|---|---|---|
| 7,734,987 B2* | 6/2010 | Kaburaki et al. | 714/774 |
| 2006/0251058 A1 | 11/2006 | Xu et al. | |
| 2007/0178906 A1* | 8/2007 | Gao et al. | 455/453 |
| 2008/0161036 A1 | 7/2008 | Tu et al. | |
| 2008/0310323 A1* | 12/2008 | Shirota et al. | 370/254 |
| 2009/0073933 A1* | 3/2009 | Madour et al. | 370/331 |
| 2009/0199268 A1* | 8/2009 | Ahmavaara et al. | 726/1 |
| 2012/0008566 A1* | 1/2012 | Peng | 370/328 |

FOREIGN PATENT DOCUMENTS

| | | | |
|---|---|---|---|
| JP | 6282502 A | 10/1994 | |
| JP | 2000032527 A | 1/2000 | |
| JP | 2002232930 A | 8/2002 | |
| KR | 1020070061163 A | 6/2007 | |
| WO | 2008129436 A2 | 10/2008 | |

OTHER PUBLICATIONS

English Translation of the Written Opinion of the International Search Authority in international application No. PCT/CN2009/075790, mailed on Apr. 1, 2011.

* cited by examiner

METHOD AND APPARATUS FOR SENDING AND RESPONDING TO NON-3GPP2 SYSTEM INFORMATION IN AN HRPD SYSTEM

TECHNICAL FIELD

The present invention relates to the technology of sending and responding to non-3rd Generation Partnership Project 2 (non-3GPP2) system information in a CDMA2000 High Rate Packet Data (HRPD) system, and in particular to a method and an apparatus for sending and responding to non-3GPP2 system information in an HRPD system.

BACKGROUND

Recently, as two new generation mainstream wideband wireless communication systems, the Long Term Evolution (LTE) system formulated by the 3GPP organization and the World Interoperability for Microwave Access (WiMax) system formulated by the WiMax Forum (WMF) and the Institute of Electrical and Electronic Engineer (IEEE) organization are developing rapidly. An important aspect is how to is realize intercommunication between a new generation wideband wireless communication system and an existing system (e.g., CDMA2000 HRPD of 3GPP2, etc.). In order to realize the intercommunication between the two network systems, a source network system should provide system information (SystemInfo) of a target network system for a mobile terminal, so that the mobile terminal can perform effective measurement on the target network system and can initiate handover to the target network system when the wireless environmental condition is appropriate, and the mobile terminal can also capture and access the target network system rapidly.

In the LTE system, there are specifically defined different types of system information, and system information of different target network systems is transmitted by broadcast, wherein SystemInformationBlockType 8 is defined to broadcast the system information of CDMA2000. Similarly, the CDMA2000 HRPD system should also be able to provide the system information of a target network system for a mobile terminal in advance before handing over to the target network system, so that the mobile terminal can perform measurement on the target network system, and can initiate handover to and access the target network system at a proper time. When the CDMA2000 HRPD system hands over to a target network system, a tendentious mode for sending the system information of the target network system is to carry the system information of the target network system by extending an existing overhead message of the HRPD system and transmit it by broadcast. The broadcast transmission mode has the advantages of saved wireless resources of an air interface, uniform transmission mode, but has the disadvantages of required modification/extension of an overhead message sub-protocol of the air interface protocol stack of an HRPD system. In this way, whether a network side or a terminal side needs adaptive changes, which causes increase in change cost, thereby making the upgrading of an original mobile terminal difficult.

SUMMARY

In view of this, the main purpose of the present invention is to provide a method and an apparatus for sending and responding to non-3GPP2 system information in an HRPD system without modifying/extending the overhead message sub-protocol of the air interface protocol stack of the HRPD system.

To achieve the above purpose, the technical solution of the present invention is implemented as follows:

A method for sending non-3GPP2 system information in a high rate packet data system, the method comprises: setting a transfer message for transferring non-3GPP2 system information (non-3GPP2 SystemInfo Transfer message) in a high rate packet data (HRPD) system; the method further comprises:

generating the non-3GPP2 SystemInfo Transfer message and sending it to a multimode mobile terminal supporting both the HRPD system and the non-3GPP2 system when a network side of the HRPD system determines that the multimode mobile terminal is located in an area covered by the HRPD system together with the non-3GPP2 system.

Preferably, the non-3GPP2 SystemInfo Transfer message may comprise: a field of message identification, a field of message sequence number, a field of non-3GPP2 SystemInfo type, a field of non-3GPP2 SystemInfo block length and a field of non-3GPP2 SystemInfo block.

Preferably, the field of message sequence number may be used for identifying a sending number of the non-3GPP2 SystemInfo Transfer message, and the message sequence number may be added by 1 every time the non-3GPP2 SystemInfo Transfer message is sent.

Preferably, the non-3GPP2 SystemInfo Transfer message may be sent to the multimode mobile terminal by a downlink dedicated control channel or a common control channel.

Preferably, the method may further comprise:

resending the non-3GPP2 SystemInfo Transfer message if an ACK message responsive to the non-3GPP2 system information is not received within a set period of time after the non-3GPP2 SystemInfo Transfer message is sent.

A method for responding to non-3GPP2 system information in a high rate packet data system, the method comprises: setting a transfer message for transferring non-3GPP2 system information (non-3GPP2 SystemInfo Transfer message) and a non-3GPP2 SystemInfo TransferAck message responsive to the transfer message in a high rate packet data (HRPD) system; the method further comprises:

parsing the non-3GPP2 SystemInfo Transfer message sent by the HRPD system after receiving it by a multimode mobile terminal supporting both the HRPD system and the non-3GPP2 system, storing parsed non-3GPP2 system information in a non-3GPP2 system processor or discarding it, generating a cause value of a processing result, generating a non-3GPP2 SystemInfo TransferAck message according to the cause value and feeding it back to the HRPD system.

Preferably, the non-3GPP2 SystemInfo Transfer message may comprise: a field of message identification, a field of message sequence number, a field of non-3GPP2 SystemInfo type, a field of non-3GPP2 SystemInfo block length and a field of non-3GPP2 SystemInfo block;

the non-3GPP2 SystemInfo TransferAck message may comprise: a field of message identification, a field of message sequence number, a field of non-3GPP2 SystemInfo type and a field of cause value.

Preferably, the field of message sequence number and the field of non-3GPP2 SystemInfo type in the non-3GPP2 SystemInfo TransferAck message may be the same as the field of message sequence number and the field of non-3GPP2 SystemInfo type in the received non-3GPP2 SystemInfo TransferAck message, respectively.

An apparatus for sending non-3GPP2 system information in a high rate packet data system comprises:

a setting unit, used for setting a transfer message for transferring non-3GPP2 system information (non-3GPP2 SystemInfo Transfer message) in a high rate packet data (HRPD) system;

a first determining unit, used for determining whether a multimode mobile terminal supporting both the HRPD system and the non-3GPP2 system is located in an area covered by the HRPD system together with the non-3GPP2 system, if yes, triggering a generating unit;

the generating unit, used for generating the non-3GPP2 SystemInfo Transfer message; and a sending unit, used for sending the non-3GPP2 SystemInfo Transfer message generated by the generating unit to the multimode mobile terminal.

Preferably, the non-3GPP2 SystemInfo Transfer message may comprise: a field of message identification, a field of message sequence number, a field of non-3GPP2 SystemInfo type, a field of non-3GPP2 SystemInfo block length and a field of non-3GPP2 SystemInfo block.

Preferably, the apparatus may further comprise:

a second determining unit, used for, after the non-3GPP2 SystemInfo Transfer message is sent, determining whether an ACK message responsive to the non-3GPP2 system information is received within a set period of time, if no, triggering a resending unit; and the resending unit, used for resending the non-3GPP2 system information.

An apparatus for responding to non-3GPP2 system information in a high rate packet data system comprises:

a setting unit, used for setting a transfer message for transferring non-3GPP2 system information (non-3GPP2 SystemInfo Transfer message) and a non-3GPP2 SystemInfo TransferAck message responsive to the transfer message in a high rate packet data (HRPD) system;

a receiving unit, used for receiving the non-3GPP2 SystemInfo Transfer message sent by the HRPD system;

a parsing unit, used for parsing the non-3GPP2 SystemInfo Transfer message received by the receiving unit;

a processing unit, used for storing non-3GPP2 system information parsed by the parsing unit in a non-3GPP2 system processor or discarding it, and generating a cause value;

a generating unit, used for generating a non-3GPP2 SystemInfo TransferAck message according to the cause value; and a sending unit, used for sending the non-3GPP2 SystemInfo TransferAck message generated by the generating unit to the HRPD system.

Preferably, the non-3GPP2 SystemInfo Transfer message may comprise: a field of message identification, a field of message sequence number, a field of non-3GPP2 SystemInfo type, a field of non-3GPP2 SystemInfo block length and a is field of non-3GPP2 SystemInfo block;

the non-3GPP2 SystemInfo TransferAck message may comprise: a field of message identification, a field of message sequence number, a field of non-3GPP2 SystemInfo type and a field of cause value.

Preferably, the field of message sequence number and the field of non-3GPP2 SystemInfo type in the non-3GPP2 SystemInfo TransferAck message generated by the generating unit may be the same as the field of message sequence number and the field of non-3GPP2 SystemInfo type in the non-3GPP2 SystemInfo Transfer message received by the receiving unit, respectively.

In the present invention, the non-3GPP2 SystemInfo is sent to a mobile terminal via a HRPD system by defining a new non-3GPP2 SystemInfo Transfer message in a non-3GPP2 information transfer application subtype and a non-3GPP2 information transfer sub-protocol introduced in the application layer of the air interface protocol stack of the HRPD system; the mobile terminal, after receiving the non-3GPP2 SystemInfo Transfer message, parses it in the manner that how the ordinary HRPD SystemInfo is parsed, after parsing the non-3GPP2 SystemInfo, stores it in a corresponding non-3GPP2 system processor according to the type of the non-3GPP2 SystemInfo; the mobile terminal encapsulates the receiving result in a newly set non-3GPP2 SystemInfo TransferAck message according to the received non-3GPP2 SystemInfo and feeds it back to the HRPD system. The present invention realizes notification of the non-3GPP2 SystemInfo of the mobile terminal in a unicast manner. As the non-3GPP2 SystemInfo is encapsulated in an HRPD system message, it is unnecessary to modify/extend the overhead message sub-protocol of the air interface protocol stack of the HRPD system, which is beneficial to the smooth evolution of the CDMA2000 HRPD system to the new generation wideband mobile communication system. The present invention is realized simply and practically.

DETAILED DESCRIPTION

The basic idea of the present invention is that non-3GPP2 SystemInfo is sent to a mobile terminal via a HRPD system by defining a new non-3GPP2 SystemInfo Transfer message in a non-3GPP2 information transfer application subtype and a non-3GPP2 information transfer sub-protocol introduced in the application layer of the air interface protocol stack of the HRPD system; the mobile terminal, after receiving the non-3GPP2 SystemInfo Transfer message, parses it in the manner that how the ordinary HRPD SystemInfo is parsed, after parsing the non-3GPP2 SystemInfo, stores it in a corresponding non-3GPP2 system processor according to the type of the non-3GPP2 SystemInfo; the mobile terminal encapsulates the receiving result (cause value) in a newly set non-3GPP2 SystemInfo TransferAck message according to the received non-3GPP2 SystemInfo and feeds it back to the HRPD system. The present invention realizes notification of the non-3GPP2 SystemInfo of the mobile terminal in a unicast manner. As the non-3GPP2 SystemInfo is transmitted in an HRPD tunnel, it is unnecessary to modify/extend the overhead message sub-protocol of the air interface protocol stack of the HRPD system, which is beneficial to the smooth evolution of the CDMA2000 HRPD system to the new generation wideband mobile communication system. The present invention is realized simply and practically.

To make the purpose, the technical solution and the advantage of the present invention more apparent, the present invention is further described below in detail by embodiments with reference to drawings.

Figure 1:
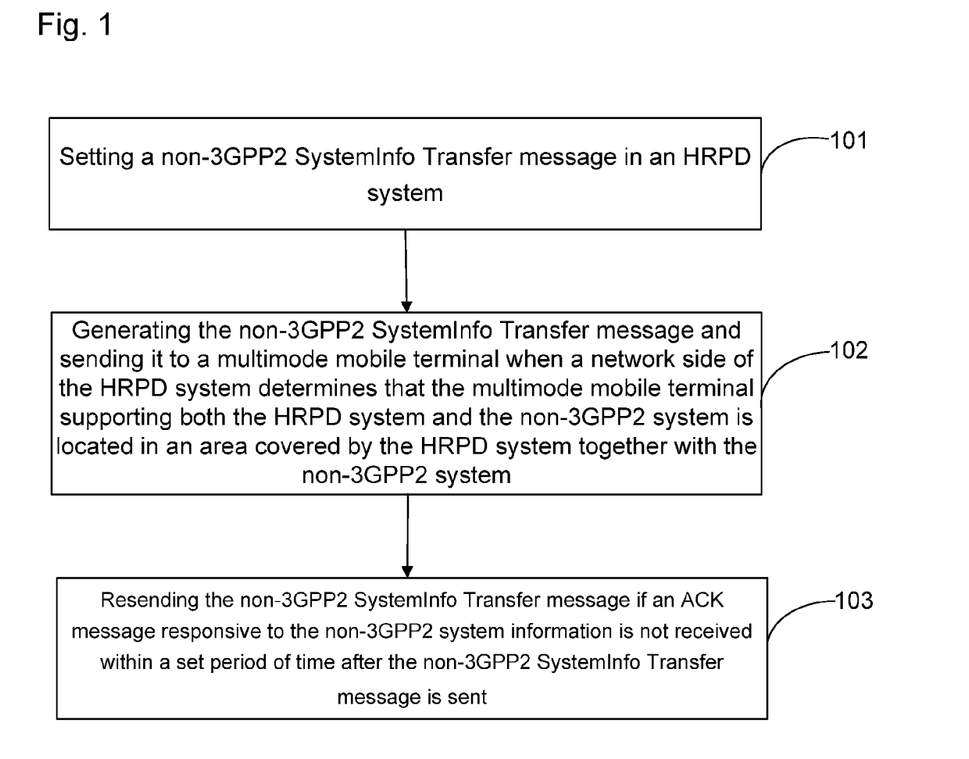
FIG. 1 is a flowchart of a method for sending non-3GPP2 system information in a high rate packet data system of the present invention.

FIG. 1 is a flowchart of a method for sending non-3GPP2 system information in a high rate packet data system of the present invention. As shown in FIG. 1, the method for sending the non-3GPP2 system information in the high rate packet data system comprises the following steps.

Step 101: setting a transfer message for transferring non-3GPP2 system information (non-3GPP2 SystemInfo Transfer message) in an HRPD system.

Step 101 is a basic step for realizing the sending of the non-3GPP2 SystemInfo in the present invention, i.e., the transfer message carrying non-3GPP2 SystemInfo is set in the HRPD system, and its structure is as shown in Table 1:

TABLE 1

| Field | Length (bit) |
|---|---|
| Message identification | 8 |
| Message sequence number | 8 |
| non-3GPP2 SystemInfo type | 8 |
| non-3GPP2 SystemInfo block length | 16 |
| non-3GPP2 SystemInfo block | non-3GPP2 SystemInfo block length × 8 |

The non-3GPP2 SystemInfo Transfer message in the present invention comprises: a field of message identification, a field of message sequence number, a field of non-3GPP2 SystemInfo type, a field of non-3GPP2 SystemInfo block length and a field of non-3GPP2 SystemInfo block, wherein the field of message identification, occupying 8 bits (i.e., one byte), is used for identifying a type of a transmitted message, i.e. identifying a newly set non-3GPP2 SystemInfo Transfer message itself in the present invention. The field of message sequence number, occupying 8 bits, is used for identifying the sending number of the message to confirm that the message has been received by the mobile terminal correctly or needs to be retransmitted. The message sequence number is added by one every time the non-3GPP2 SystemInfo Transfer message is sent, and the message sequence number is set to be one when a first non-3GPP2 SystemInfo Transfer message is generated. The field of non-3GPP2 SystemInfo type, occupying 8 bits, is used for identifying the type of the non-3GPP2 SystemInfo carried by the non-3GPP2 SystemInfo Transfer message of the present invention, for example determining whether the SystemInfo is the SystemInfo of the LTE system, or the SystemInfo of the WiMax system, or the SystemInfo of other systems. The field of non-3GPP2 SystemInfo block length, occupying 8 bits, is used for identifying the length (calculated in byte) of the non-3GPP2 SystemInfo carried by the non-3GPP2 SystemInfo Transfer message of the present invention. The field of non-3GPP2 SystemInfo block is specific non-3GPP2 SystemInfo carried by the non-3GPP2 SystemInfo Transfer message of the present invention, and the bits occupied by the field of non-3GPP2 SystemInfo block are the bits of the field of non-3GPP2 SystemInfo block length multiplied by 8. Those skilled in the art should understand that, the structure of the non-3GPP2 SystemInfo Transfer message shown in Table 1 is merely exemplary, the carrying mode of the above-mentioned fields is not used for limitation, and the illustrated fields are only the basic fields required.

Here, the 3GPP2 system refers to the CDMA2000 1X system and HRPD system formulated by 3GPP2 standard organization, and the non-3GPP2 system refers to systems formulated by wireless standard organizations other than the 3GPP2 standard organization, such as Global System for Mobile Communication (GSM), General Packet Radio Service (GPRS) system, Wideband Code Division Multiple Access (WCDMA) system and the like formulated by 3GPP organization, WiMax system formulated by IEEE and WMF, and Wireless Local Area Network (WLAN) system formulated by IEEE, etc.

Step 102: generating the non-3GPP2 SystemInfo Transfer message and sending it to a multimode mobile terminal when a network side of the HRPD system determines that the multimode mobile terminal supporting both the HRPD system and the non-3GPP2 system is located in an area covered by the HRPD system together with the non-3GPP2 system.

When the multimode mobile terminal supporting both the HRPD system and the non-3GPP2 system is moving in the HRPD system and the HRPD system detects that the multimode mobile terminal is located in the area covered by the HRPD system together with the non-3GPP2 system, the aforementioned non-3GPP2 SystemInfo Transfer message is generated according to the type of the non-3GPP2 system to which the coverage area where the multimode mobile terminal is located belongs, while it is determined that the multimode mobile terminal is located in the area covered by the HRPD system together with the LTE system, the non-3GPP2 SystemInfo Transfer message is generated, in which the field of non-3GPP2 SystemInfo type is a character indicating the LTE system and the field of non-3GPP2 SystemInfo block is the system information of the LTE system. It should be noted that, the non-3GPP2 SystemInfo needs to be configured in the HRPD system in is advance, or a corresponding channel for aquiring the non-3GPP2 SystemInfo is set between the HRPD system and the non-3GPP2 system, so that the HRPD system can acquire current system information of each non-3GPP2 system. Those skilled in the art should understand that, it is easy to realize that the non-3GPP2 system reports the non-3GPP2 SystemInfo initiatively to the HRPD system. When generating the non-3GPP2 SystemInfo Transfer message, the HRPD system reads out the non-3GPP2 SystemInfo stored in the HRPD system and puts it in the field of non-3GPP2 SystemInfo block.

The HRPD system carries the non-3GPP2 SystemInfo Transfer message on a downlink dedicated control channel (when the mobile terminal is in a connected state) or a common control channel (when the mobile terminal is in an idle state) and sends it to the multimode mobile terminal.

After Step 102, the present invention further comprises:

Step 103: resending the non-3GPP2 SystemInfo Transfer message if an ACK message responsive to the non-3GPP2 system information is not received within a set period of time after the non-3GPP2 SystemInfo Transfer message is sent.

The network side of the HRPD system receives an Ack message responsive to the non-3GPP2 SystemInfo Transfer message on an uplink HRPD channel. The network side of the HRPD system resends the non-3GPP2 SystemInfo Transfer message if the HRPD system does not receive the Ack message responsive to the non-3GPP2 SystemInfo Transfer message sent previously within a specified time. Reference may be made to the related description in the following Step 202 of the specification for the specific realization of resending. Those skilled in the art should understand that, Step 103 is an optimization for the technical solution recited in Steps 101 and 102, and is not a necessary step of realizing the basic technical solution of the method for sending the non-3GPP2 SystemInfo in the high rate packet data system of the present invention.

The method shown in FIG. 1 is applicable to the network side of the HRPD system.

Figure 2:
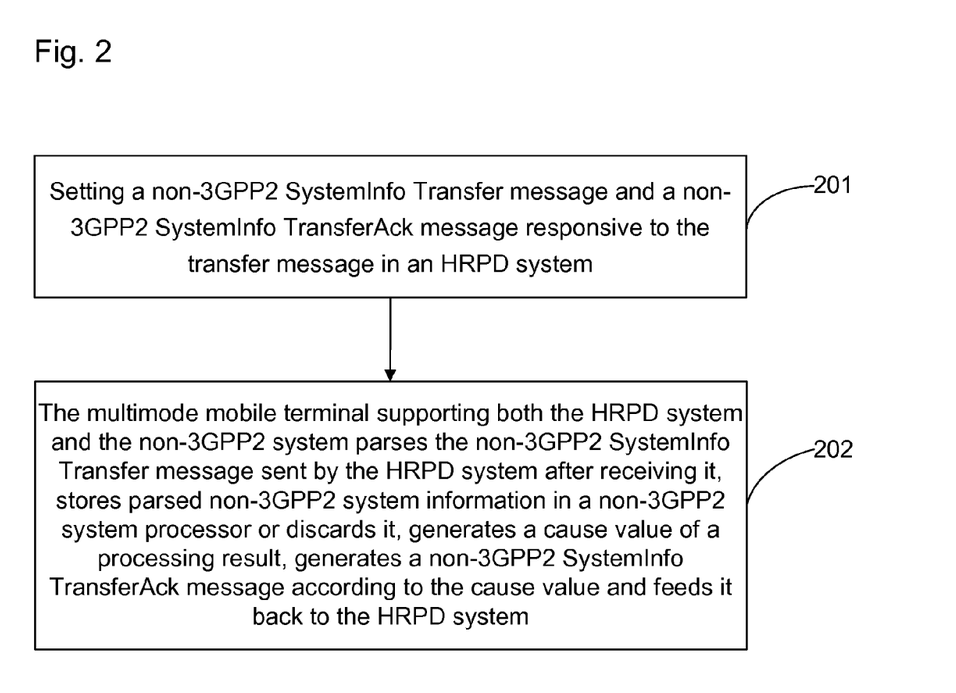
FIG. 2 is a flowchart of a method for responding to non-3GPP2 system information in a high rate packet data system of the present invention.

FIG. 2 is a flowchart of a method for responding to non-3GPP2 system information in the high rate packet data system of the present invention, and as shown in FIG. 2, the method for responding to the non-3GPP2 system information in is the high rate packet data system comprises the following steps.

Step 201: setting a transfer message for transferring non-3GPP2 system information (non-3GPP2 SystemInfo Transfer message) and a non-3GPP2 SystemInfo TransferAck message responsive to the transfer message in an HRPD system.

Similar to Step 101, Step 201 is also a basic step of realizing the present invention. As the method for responding to the non-3GPP2 SystemInfo in the HRPD system shown in FIG. 2 is proposed for the multimode mobile terminal supporting the HRPD system and the non-3GPP2 system, compared to Step 101, an Ack message responsive to the non-3GPP2 SystemInfo Transfer message needs to be set in the HRPD system. As the specific structure of the non-3GPP2 SystemInfo Transfer message has been shown in table 1, the structure thereof will not be described here. A structure of the non-3GPP2 SystemInfo TransferAck message is given below, as shown in table 2:

TABLE 2

| Field | Length (bit) |
|---|---|
| Message identification | 8 |
| Message sequence number | 8 |
| Non-3GPP2 SystemInfo type | 8 |
| Cause value | 8 |

The non-3GPP2 SystemInfo TransferAck message in the present invention comprises: a field of message identification, a field of message sequence number, a field of non-3GPP2 SystemInfo type and a field of cause value, wherein the field of message identification field, occupying 8 bits, is used for identifying a type of a message, i.e. identifying that the message is a non-3GPP2 SystemInfo TransferAck message; the content filled in the field of message sequence number is the same as the message sequence number in the non-3GPP2 SystemInfo Transfer message received by the multimode mobile terminal; the field of non-3GPP2 SystemInfo type, which has the same type as the non-3GPP2 SystemInfo in the received non-3GPP2 SystemInfo Transfer message, is used for identifying the Ack message responsive to the non-3GPP2 SystemInfo is of which type, i.e., determining whether the Ack message is responsive to the SystemInfo of the LTE system, or responsive to the SystemInfo of the WiMax system, or responsive to the SystemInfo of other systems; is the field of cause value is used for identifying that whether the transmitted non-3GPP2 SystemInfo is accepted (stored in the non-3GPP2 system processor), or discarded, or subjected to other processing, so that the HRPD system can understand how the multimode mobile terminal processes the non-3GPP2 SystemInfo sent by the HRPD system to determine whether the message needs to be retransmitted.

Step 202: the multimode mobile terminal supporting both the HRPD system and the non-3GPP2 system parses the non-3GPP2 SystemInfo Transfer message sent by the HRPD system after receiving it, stores parsed non-3GPP2 system information in a non-3GPP2 system processor or discards it, generates a cause value of a processing result, generates a non-3GPP2 SystemInfo TransferAck message according to the cause value and feeds it back to the HRPD system.

The multimode mobile terminal in the HRPD system transmits the non-3GPP2 SystemInfo Transfer message sent by the HRPD system to signalling application protocol of HRPD of UE after receiving it. The signalling protocol parses the non-3GPP2 SystemInfo Transfer message in the manner that how the conventional message in the HRPD system is parsed, stores the non-3GPP2 SystemInfo in a corresponding non-3GPP2 system processor according to the type of the non-3GPP2 system to which the SystemInfo belongs after obtaining the non-3GPP2 SystemInfo. For example, a dual-mode mobile terminal supporting the HRPD system and the LTE system stores the system information of the LTE system in the processor supporting the LTE system after receiving the system information of the LTE system sent by the network side of the HRPD system. In such a way, when a mobile terminal determines that it accesses a non-3GPP2 system, the mobile terminal monitors the service of the non-3GPP2 system according to the non-3GPP2 SystemInfo sent by the network side of the HRPD system. Specific processing is that the non-3GPP2 system processor in the multimode mobile terminal generates the non-3GPP2 SystemInfo TransferAck message which carries a cause value according to the current stored non-3GPP2 SystemInfo and the received new non-3GPP2 SystemInfo. The cause value may include some situations below: the multimode mobile terminal receives the non-3GPP2 SystemInfo for a first time and stores it, or previously stored is non-3GPP2 SystemInfo and the newly received non-3GPP2 SystemInfo are different and the storage has been updated, or the multimode mobile terminal does not support the version of the received non-3GPP2 SystemInfo, etc. The multimode mobile terminal encapsulates the cause value in the non-3GPP2 SystemInfo TransferAck message, wherein the field of message identification corresponds to a value defined by the non-3GPP2 SystemInfo TransferAck message; the value of the field of message sequence number is the value of the field of message sequence number in the previously received and stored non-3GPP2 SystemInfo Transfer message. Then the non-3GPP2 SystemInfo TransferAck message is carried through the message of the signalling application protocol of HRPD, and sent to the network side of the HRPD system by a basic HRPD channel, such as the uplink dedicated control channel (in the connected state) or the common control channel (in the idle state).

The network side of the HRPD system receives the non-3GPP2 SystemInfo TransferAck message on the uplink HRPD channel and sends it to the signalling application protocol of HRPD in the HRPD system, which parses the non-3GPP2 SystemInfo TransferAck message. The HRPD system will resend the non-3GPP2 SystemInfo Transfer message if it does not receive the non-3GPP2 SystemInfo TransferAck message having the same message sequence number value as the previously sent the non-3GPP2 SystemInfo Transfer message within a specified time. If successfully receiving the non-3GPP2 SystemInfo TransferAck message having the same message sequence number value within a specified time, the HRPD system parses the cause value in the non-3GPP2 SystemInfo TransferAck message and determines whether to resend the non-3GPP2 SystemInfo Transfer message carrying the non-3GPP2 SystemInfo according the parsed cause value. When it is determined that the multimode mobile terminal does not support the version of the received non-3GPP2 SystemInfo, the non-3GPP2 SystemInfo Transfer message will not be sent to the multimode mobile terminal.

The method for responding to the non-3GPP2 SystemInfo in the high rate packet data system shown in FIG. 2 is applicable to the multimode mobile terminal side supporting the HRPD system and the non-3GPP2 system.

Figure 3:
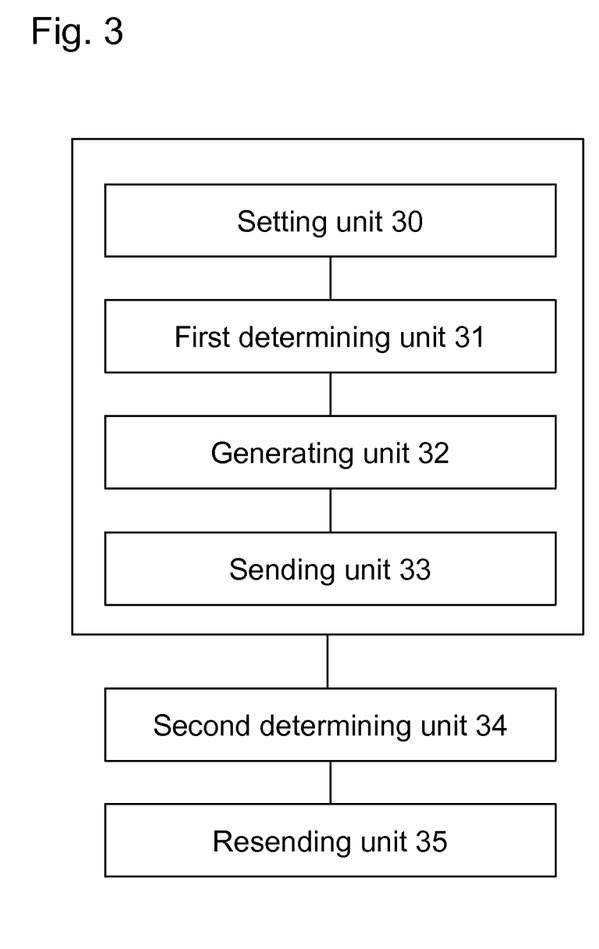
FIG. 3 is a structure diagram of an apparatus for sending non-3GPP2 system information in a high rate packet data system of the present invention.

FIG. 3 is a structure diagram of an apparatus for sending non-3GPP2 SystemInfo in a high rate packet data system of the present invention, and as shown in FIG. 3, is the apparatus for sending the non-3GPP2 SystemInfo in the high rate packet data system of the present invention comprises a setting unit 30, a first determining unit 31, a generating unit 32 and a sending unit 33, wherein the setting unit 30 is used for setting a transfer message for transferring non-3GPP2 system information (non-3GPP2 SystemInfo Transfer message) in an HRPD system. Reference may be made to the related description of the abovementioned table 1 for the specific structure of the non-3GPP2 SystemInfo Transfer message. The first determining unit 31 is used for determining whether a multimode mobile terminal supporting both the HRPD system and the non-3GPP2 system is located in an area covered by the HRPD system together with the non-3GPP2 system, if yes, triggering the generating unit 32. The generating unit 32 is used for generating a non-3GPP2 SystemInfo Transfer message. The sending unit 33 is used for sending the non-3GPP2 SystemInfo Transfer message generated by the generating unit 32 to the multimode mobile terminal.

As shown in FIG. 3, the apparatus for sending the non-3GPP2 SystemInfo in the high rate packet data system of the present invention further comprises a second determining unit 34 and a resending unit 35, wherein the second determining unit 34 is used for, after the non-3GPP2 SystemInfo is sent, determining whether an ACK message responsive to the non-3GPP2 system information is received within a set period of time, if no, triggering the resending unit 35. The resending unit 35 is used for resending the non-3GPP2 SystemInfo. The second determining unit 34 and the resending unit 35 are not the units necessary for the apparatus for sending the non-3GPP2 SystemInfo in the high rate packet data system of the present invention, but preferred components.

The sending apparatus shown in FIG. 3 is applicable to the network side of the HRPD system.

Those skilled in the art should understand that, the apparatus for sending the non-3GPP2 SystemInfo in the high rate packet data system of the present invention shown in FIG. 3 is designed for realizing the method for sending the non-3GPP2 SystemInfo in the high rate packet data system shown in FIG. 1, the realization function of each processing unit in the apparatus shown in FIG. 3 can be understood with reference to the related descriptions in the method shown in FIG. 1, and the function of each unit may be realized through programs running on a processor, or is may also be realized through a corresponding logic circuit.

Figure 4:
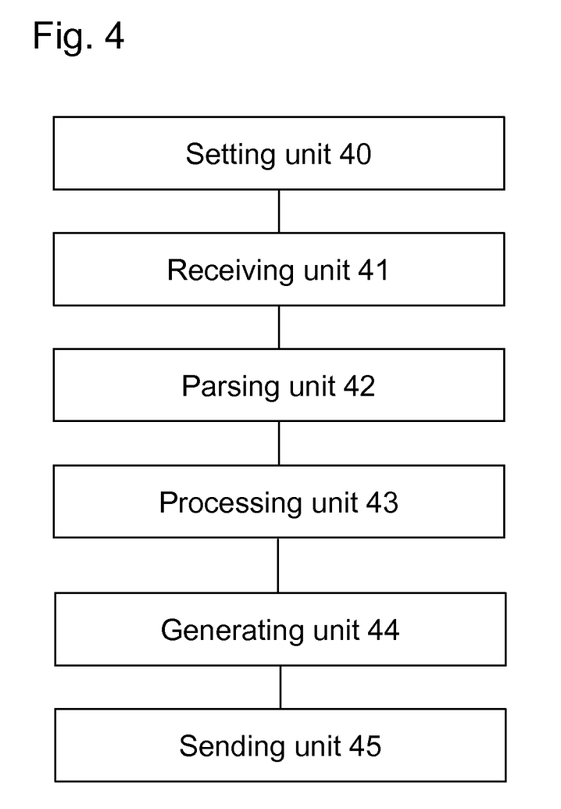
FIG. 4 is a structure diagram of a responsive apparatus for responding to non-3GPP2 system information in a high rate packet data system of the present invention.

FIG. 4 is a structure diagram of a responsive apparatus for responding to non-3GPP2 SystemInfo in a high rate packet data system of the present invention, and as shown in FIG. 4, the responsive apparatus for responding to the non-3GPP2 SystemInfo in the high rate packet data system of the present invention comprises a setting unit 40, a receiving unit 41, a parsing unit 42, a processing unit 43, a generating unit 44 and a sending unit 45, wherein the setting unit 40 is used for setting a transfer message for transferring non-3GPP2 system information (non-3GPP2 SystemInfo Transfer message) and a non-3GPP2 SystemInfo TransferAck message responsive to the transfer message in an HRPD system. Reference may be made to the related description of the abovementioned table 2 for the specific structure of the non-3GPP2 SystemInfo TransferAck message. The receiving unit 41 is used for receiving the non-3GPP2 SystemInfo Transfer message sent by the HRPD system. The parsing unit 42 is used for parsing the non-3GPP2 SystemInfo Transfer message received by the receiving unit 41. The processing unit 43 is used for storing the system information (SystemInfo) of the non-3GPP2 system parsed by the parsing unit 42 in a non-3GPP2 system processor or discarding it, and generating a cause value. The generating unit 44 is used for generating the non-3GPP2 SystemInfo TransferAck message according to the cause value, i.e. the cause value generated by the processing unit 43 is inserted into the field of cause value in the non-3GPP2 SystemInfo TransferAck message shown in table 2. The sending unit 45 is used for sending the non-3GPP2 SystemInfo TransferAck message generated by the generating unit 44 to the HRPD system.

The apparatus shown in FIG. 4 is applicable to the multimode mobile terminal supporting the HRPD system and the non-3GPP2 system.

Those skilled in the art should understand that, the apparatus for responding to the non-3GPP2 SystemInfo in the high rate packet data system of the present invention shown in FIG. 4 is designed for realizing the method for responding to the non-3GPP2 SystemInfo in the high rate packet data system shown in FIG. 2, the realization function of each processing unit in the apparatus shown in FIG. 4 can be understood with reference to the related descriptions in the method shown in FIG. 2, and the function of each unit may be realized through programs running on a processor, or may also be realized through a corresponding logic circuit.

The above is only preferred embodiments of the present invention, but does not limit the protective scope of the present invention.

The invention claimed is:

1. A method for sending non-3GPP2 system information in a high rate packet data system, the method comprising:
    defining a structure of a transfer message for transferring non-3GPP2 system information (non-3GPP2 SystemInfo Transfer message) in a high rate packet data (HRPD) system;
    generating the non-3GPP2 SystemInfo Transfer message having the defined structure and sending it to a multimode mobile terminal supporting both the HRPD system and the non-3GPP2 system when a network side of the HRPD system determines that the multimode mobile terminal is located in an area covered by the HRPD system together with the non-3GPP2 system;
    wherein the non-3GPP2 SystemInfo Transfer message comprises: a field of message identification, a field of message sequence number, a field of non-3GPP2 SystemInfo type, a field of non-3GPP2 SystemInfo block length and a field of non-3GPP2 SystemInfo block.

2. The method according to claim 1, wherein the field of message sequence number is used for identifying a sending number of the non-3GPP2 SystemInfo Transfer message, and the message sequence number is added by 1 every time the non-3GPP2 SystemInfo Transfer message is sent.

3. The method according to claim 1, wherein the non-3GPP2 SystemInfo Transfer message is sent to the multimode mobile terminal by a downlink dedicated control channel or a common control channel.

4. The method according to claim 3, the method further comprising:
    resending the non-3GPP2 SystemInfo Transfer message if an ACK message responsive to the non-3GPP2 system information is not received within a set period of time after the non-3GPP2 SystemInfo Transfer message is sent.

5. A method for responding to non-3GPP2 system information in a high rate packet data system, the method comprising:
    defining a structure of a transfer message for transferring non-3GPP2 system information (non-3GPP2 SystemInfo Transfer message) and a non-3GPP2 SystemInfo TransferAck message responsive to the transfer message in a high rate packet data (HRPD) system;
    parsing the non-3GPP2 SystemInfo Transfer message having the defined structure sent by the HRPD system after receiving it by a multimode mobile terminal supporting both the HRPD system and the non-3GPP2 system, storing parsed non-3GPP2 system information in a non-3GPP2 system processor or discarding it, generating a cause value of a processing result, generating a non-3GPP2 SystemInfo TransferAck message according to the cause value and feeding it back to the HRPD system;

wherein the non-3GPP2 SystemInfo Transfer message comprises: a field of message identification, a field of message sequence number, a field of non-3GPP2 SystemInfo type, a field of non-3GPP2 SystemInfo block length and a field of non-3GPP2 SystemInfo block;

the non-3GPP2 SystemInfo TransferAck message comprises: a field of message identification, a field of message sequence number, a field of non-3GPP2 SystemInfo type and a field of cause value.

6. The method according to claim 5, wherein the field of message sequence number and the field of non-3GPP2 SystemInfo type in the non-3GPP2 SystemInfo TransferAck message are the same as the field of message sequence number and the field of non-3GPP2 SystemInfo type in the received non-3GPP2 SystemInfo TransferAck message, respectively.

7. An apparatus for sending non-3GPP2 system information in a high rate packet data system, comprising: a defining unit, a first determining unit, a generating unit and a sending unit, wherein the defining unit is used for defining a structure of a transfer message for transferring non-3GPP2 system information (non-3GPP2 SystemInfo Transfer message) in a high rate packet data (HRPD) system;

the first determining unit is used for triggering the generating unit, if a multimode mobile terminal supporting both the HRPD system and the non-3GPP2 system is determined to be located in an area covered by the HRPD system together with the non-3GPP2 system;

the generating unit is used for generating the non-3GPP2 SystemInfo Transfer message having the defined structure; and the sending unit is used for sending the non-3GPP2 SystemInfo Transfer message generated by the generating unit to the multimode mobile terminal;

wherein the non-3GPP2 SystemInfo Transfer message comprises: a field of message identification, a field of message sequence number, a field of non-3GPP2 SystemInfo type, a field of non-3GPP2 SystemInfo block length and a field of non-3GPP2 SystemInfo block.

8. The apparatus according to claim 7, further comprising a second determining unit and a resending unit, wherein the second determining unit is used for, after the non-3GPP2 SystemInfo Transfer message is sent, triggering the resending unit when an ACK message responsive to the non-3GPP2 system information is not received within a set period of time;

the resending unit is used for resending the non-3GPP2 system information.

9. An apparatus for responding to non-3GPP2 system information in a high rate packet data system, comprising: a defining unit, a receiving unit, a parsing unit, a processing unit, a generating unit and a sending unit, wherein the defining unit is used for defining a structure of a transfer message for transferring non-3GPP2 system information (non-3GPP2 SystemInfo Transfer message) and a non-3GPP2 SystemInfo TransferAck message responsive to the transfer message in a high rate packet data (HRPD) system;

the receiving unit is used for receiving the non-3GPP2 SystemInfo Transfer message having the defined structure sent by the HRPD system;

the parsing unit is used for parsing the non-3GPP2 SystemInfo Transfer message received by the receiving unit;

the processing unit is used for storing non-3GPP2 system information parsed by the parsing unit in a non-3GPP2 system processor or discarding it, and generating a cause value;

the generating unit is used for generating a non-3GPP2 SystemInfo TransferAck message according to the cause value; and the sending unit is used for sending the non-3GPP2 SystemInfo TransferAck message generated by the generating unit to the HRPD system;

wherein the non-3GPP2 SystemInfo Transfer message comprises: a field of message identification, a field of message sequence number, a field of non-3GPP2 SystemInfo type, a field of non-3GPP2 SystemInfo block length and a field of non-3GPP2 SystemInfo block;

the non-3GPP2 SystemInfo TransferAck message comprises: a field of message identification, a field of message sequence number, a field of non-3GPP2 SystemInfo type and a field of cause value.

10. The apparatus according to claim 9, wherein the field of message sequence number and the field of non-3GPP2 SystemInfo type in the non-3GPP2 SystemInfo TransferAck message generated by the generating unit are the same as the field of message sequence number and the field of non-3GPP2 SystemInfo type in the non-3GPP2 SystemInfo Transfer message received by the receiving unit, respectively.

11. The method according to claim 2, wherein the non-3GPP2 SystemInfo Transfer message is sent to the multimode mobile terminal by a downlink dedicated control channel or a common control channel.

12. The method according to claim 11, the method further comprising:

resending the non-3GPP2 SystemInfo Transfer message if an ACK message responsive to the non-3GPP2 system information is not received within a set period of time after the non-3GPP2 SystemInfo Transfer message is sent.

* * * * *

UNITED STATES PATENT AND TRADEMARK OFFICE
CERTIFICATE OF CORRECTION

PATENT NO.        : 8,717,953 B2                                                      Page 1 of 1
APPLICATION NO. : 13/258303
DATED             : May 6, 2014
INVENTOR(S)       : Peng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 117 days.

Signed and Sealed this
Twenty-ninth Day of September, 2015

Michelle K. Lee
*Director of the United States Patent and Trademark Office*